(12) United States Patent
Eisen et al.

(10) Patent No.: US 10,848,482 B1
(45) Date of Patent: Nov. 24, 2020

(54) IMAGE-BASED AUTHENTICATION SYSTEMS AND METHODS

(71) Applicant: Trusona, Inc., Scottsdale, AZ (US)

(72) Inventors: Ori Eisen, Scottsdale, AZ (US); Clayton Lengel-Zigich, Scottsdale, AZ (US); Nikolas Mangu-Thitu, Lexington, KY (US)

(73) Assignee: Trusona, Inc., Scottsdale, AZ (US)

( * ) Notice: Subject to any disclaimer, the term of this patent is extended or adjusted under 35 U.S.C. 154(b) by 34 days.

(21) Appl. No.: 15/438,594

(22) Filed: Feb. 21, 2017

Related U.S. Application Data

(60) Provisional application No. 62/297,109, filed on Feb. 18, 2016.

(51) Int. Cl.
*H04L 29/06* (2006.01)
*G06F 40/289* (2020.01)
*G06F 3/0482* (2013.01)

(52) U.S. Cl.
CPC .......... *H04L 63/083* (2013.01); *G06F 40/289* (2020.01); *H04L 63/0853* (2013.01); *G06F 3/0482* (2013.01)

(58) Field of Classification Search
CPC .............. H04L 63/083; H04L 63/0853; G06F 17/2775; G06F 3/0482
See application file for complete search history.

(56) References Cited

U.S. PATENT DOCUMENTS

| | | | |
|---|---|---|---|
| 8,117,458 B2 | 2/2012 | Osborn et al. | |
| 8,347,103 B2 | 1/2013 | Jones et al. | |
| 8,881,251 B1 | 11/2014 | Hilger | |
| 2008/0244700 A1* | 10/2008 | Osborn | G06F 21/36 726/2 |
| 2011/0219427 A1 | 9/2011 | Hito et al. | |
| 2013/0340057 A1* | 12/2013 | Kitlyar | G06F 21/36 726/6 |
| 2014/0007205 A1 | 1/2014 | Oikonomou | |

(Continued)

OTHER PUBLICATIONS

Yamamoto et al., "Advantages of User Authentication Using Unclear Images Automatic Generation of Decoy Images," 2009 International Conference on Advanced Information Networking and Applications Year: 2009 | Conference Paper | Publisher: IEEE.*

(Continued)

*Primary Examiner* — Roderick Tolentino
(74) *Attorney, Agent, or Firm* — Wilson Sonsini Goodrich & Rosati

(57) ABSTRACT

Systems and methods for authenticating a user are provided. A method may comprise providing interactive media on a computing device associated with a user. The interactive media may comprise a plurality of images. The plurality of images may be presented on a graphical display of the computing device. The method may also comprise receiving input data from the computing device when the user selects a sequence of images from the plurality of images on the graphical display of the computing device. The selected sequence of images may correspond to a sequence of grammatical words. The method may further comprise analyzing the input data by comparing the sequence of grammatical words to a passcode, and authenticating the user when the sequence of grammatical words is equal to the passcode.

14 Claims, 11 Drawing Sheets

(56) References Cited

U.S. PATENT DOCUMENTS

| | | | |
|---|---|---|---|
| 2014/0033050 A1* | 1/2014 | Shin | H04N 21/4788 715/733 |
| 2014/0351143 A1* | 11/2014 | Wajsbrot | G06F 21/313 705/64 |
| 2015/0051913 A1* | 2/2015 | Choi | H04M 1/67 704/273 |
| 2016/0006731 A1* | 1/2016 | Zisapel | H04L 63/0861 726/5 |
| 2016/0065572 A1* | 3/2016 | Kim | H04L 63/0861 726/7 |
| 2016/0132676 A1* | 5/2016 | Avganim | G06F 21/45 726/18 |
| 2016/0134660 A1* | 5/2016 | Ponsini | G06F 8/61 726/1 |
| 2017/0300686 A1* | 10/2017 | Shyu | G06K 9/00604 |
| 2018/0018514 A1* | 1/2018 | Azam | G06F 3/013 |

OTHER PUBLICATIONS

Nazir et al., "User authentication for mobile device through image selection," 2009 First International Conference on Networked Digital Technologies Year: 2009 | Conference Paper | Publisher: IEEE.*
Confident Technologies®. Confident CAPTCHA. Image-Based Captcha Authentication Solutions. Accessed: Oct. 29, 2015. 3 pages. URL: <http://confidenttechnologies.com/confident-captcha/>.

* cited by examiner

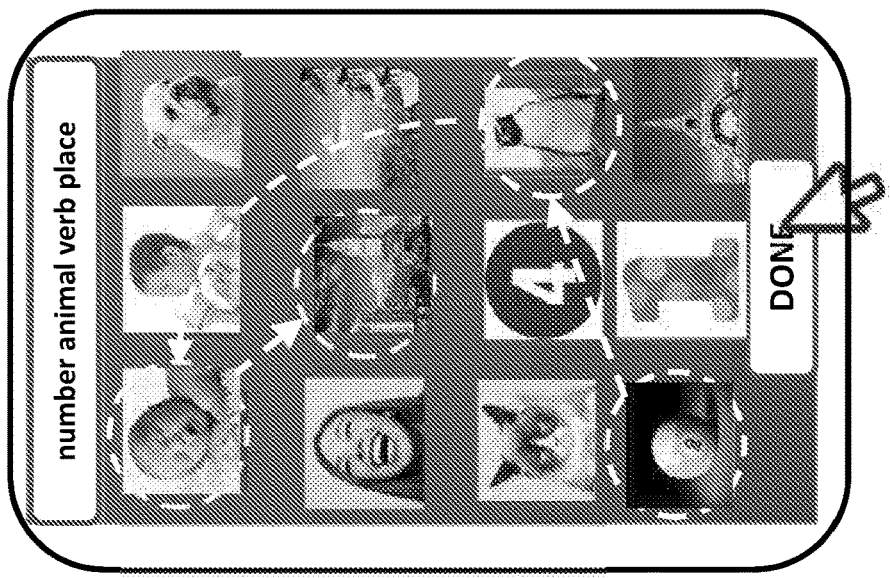
Part C
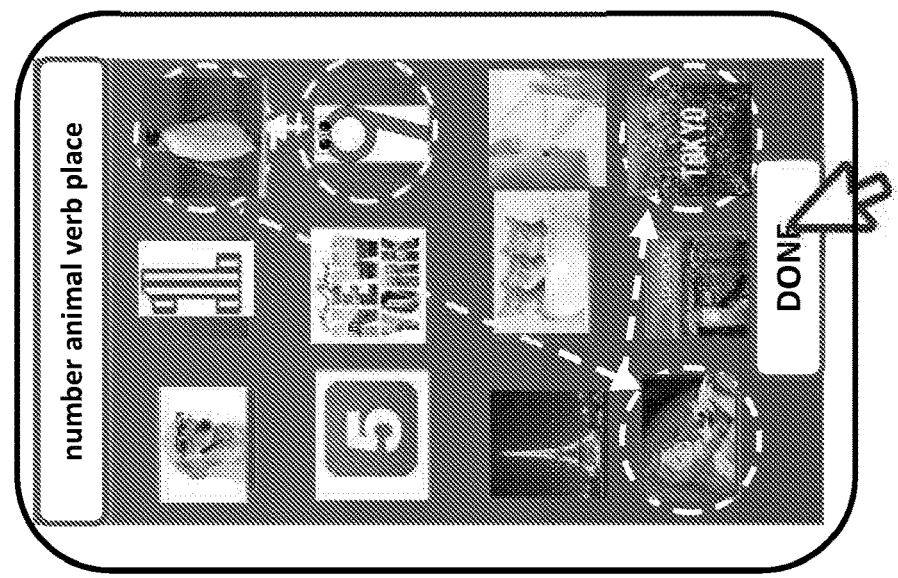
Part B
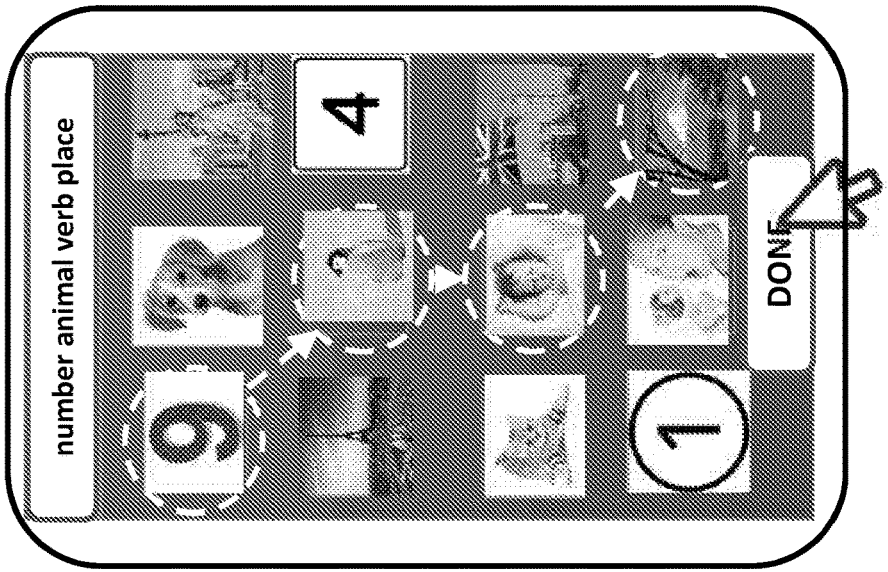
Part A
FIG. 11

IMAGE-BASED AUTHENTICATION SYSTEMS AND METHODS

CROSS-REFERENCE TO RELATED APPLICATION

This application claims priority to U.S. Provisional Application No. 62/297,109 filed on Feb. 18, 2016, the content of which is incorporated herein in its entirety.

BACKGROUND

The ubiquity of computing technology and the Internet has led to a proliferation of computing devices and web services. These devices and services typically require users to enter log-in credentials (e.g., in the form of usernames and/or passwords) before access is granted. Different computing devices and web services, however, have varying security requirements and impose different rules on the length and type of characters that can be used for log-in credentials. As a result, users who have a variety of computing devices and web accounts may need to recall a large number of different log-in credentials, most of which are in alphanumeric form and are non-intuitive and difficult to remember.

SUMMARY

Accordingly, a need exists for systems and methods that can improve the user authentication process. The image-based authentication systems and methods described herein can address the above need, by allowing users to generate, recall, and/or enter their passcodes in a logical and intuitive manner. A device may be used during a user authentication session. The device may be configured to display a plurality of different images to a user. The user may select a sequence of images that collectively correspond to the user's passcode. Each image may be indicative of a word within a unique category, such that a sequence of words can be obtained from the sequence of images. The sequence of images/words may form a sentence that conveys a "story," and that can be easily recalled by a user. In some cases, the sentence can be associated with a time, place, and/or event of significance to the user, that can aid the user in remembering the image-based passcode. Unlike conventional alphanumeric passwords that are non-intuitive and difficult to remember, the image-based passcodes in the systems and methods described herein are visual and can be used to form a sentence (e.g., a "story") that is intuitive to a user, and that can quickly trigger the user's memory during an authentication session.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 11 shows the display of different images to a user during different authentication sessions, in accordance with some embodiments.

DETAILED DESCRIPTION

Figure 1:
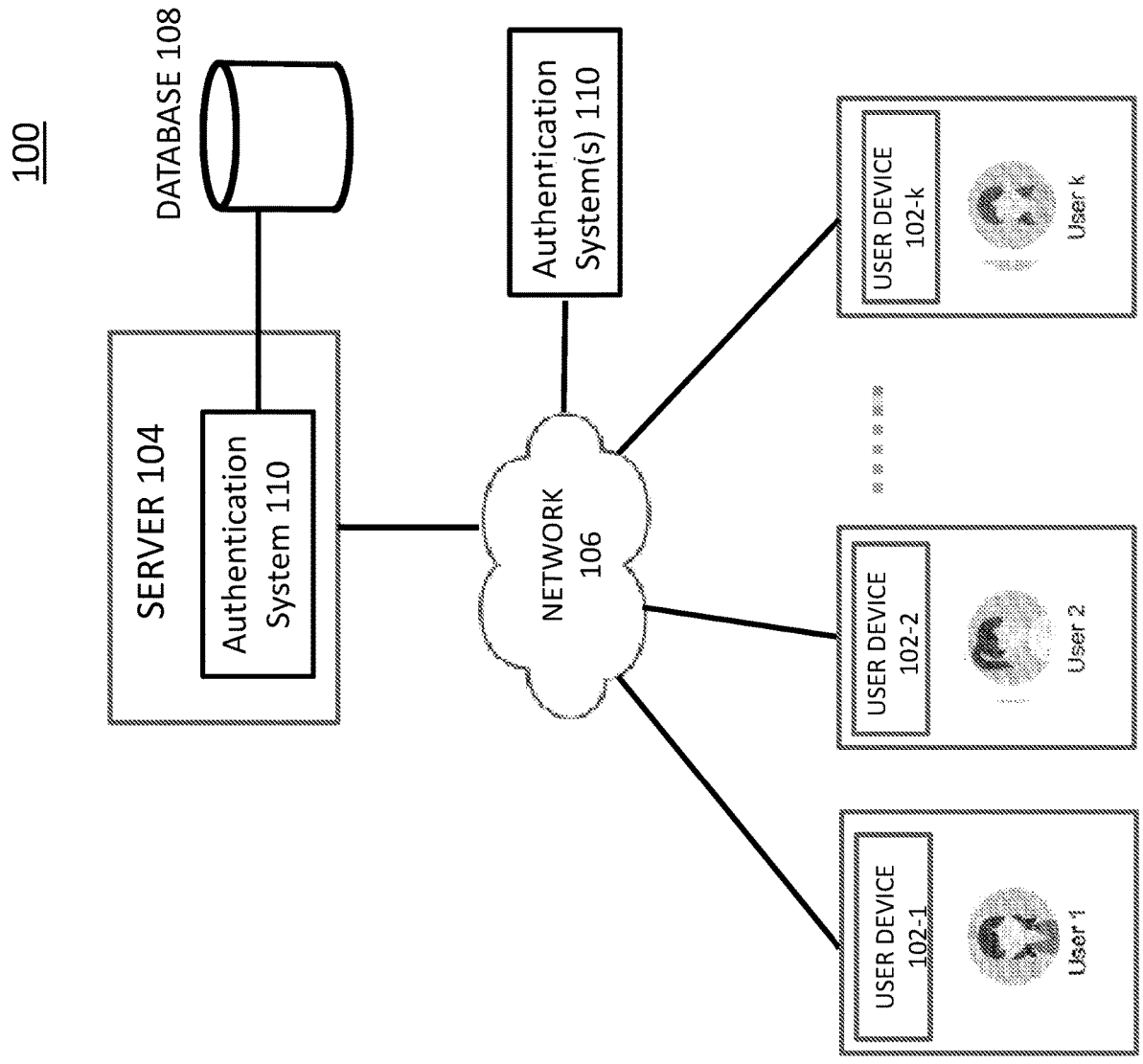
FIG. 1 shows an exemplary network layout comprising one or more authentication systems, in accordance with some embodiments.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention described herein provides systems and methods for user authentication in which a user selects a sequence of images from a plurality of images presented to the user. Unlike conventional alphanumeric passwords that are non-intuitive and difficult to remember, the image-based passcodes in the systems and methods described herein are visual and can be used to construct a sentence (for example, a "story") that is intuitive to a user, easily recalled by the user, and that can quickly trigger the user's memory during an authentication session. A passcode as used herein may be referred to interchangeably as a password. A passcode may comprise one or more words. Each word may comprise one or more characters. The one or more words in a passcode may form a phrase or a sentence.

Various aspects of the invention described herein may be applied to any of the particular applications set forth below. The invention can be applied on any computing device, web service, software application, and/or security system that requires user authentication before access is granted to a user. The invention can be implemented using software, hardware, or a combination of hardware or software, on one or more computing devices. In some embodiments, the invention can provide a user authentication session through a graphical user interface (GUI) rendered on a computing device. It shall be understood that different aspects of the invention can be appreciated individually, collectively or in combination with each other.

Traditional knowledge-based authentication is typically based on either user recall or user recognition of authentication information. In user recall methods, the authentication information is usually in the form of alphanumeric passwords or personal identification numbers (PINs). In user recognition method, the authentication information is usually in the form of visual passwords.

People often find it difficult to remember alphanumeric passwords. Different computing devices and web accounts have varying security requirements and impose a plethora of rules on the length and type of characters that can be used in passwords. Those rules may require, for example: (1) a combination of uppercase letters, lowercase letters, numerical digits, and/or special characters; (2) a minimum and/or maximum password length; (3) that no characters be sequentially repeated within the password; (4) that the password does not contain personal information (such as the user's legal name, birth date, or address) or words that are found in most dictionaries; and/or (5) that the password has not been previously used by the user for that account or device. As a result, users who have a variety of devices and web accounts may have to generate and recall a large number of different passwords, most of which are in alphanumeric form and are non-intuitive and difficult to remember. It is also common for users to forget their passwords for devices and accounts that the users do not frequently use or access.

In some cases, a user may be required to change his/her password at regular time intervals (e.g., every three months), which exacerbates the problem of remembering passwords. When users forget their passwords, they have to reset and regenerate their passwords which can be a time-consuming process. A user who is unable to recall his password may be prevented from logging on to his/her system or account after a number of failed authentication attempts. This "lock-out" can create substantial inconvenience for the user.

There are two reasons people may forget passwords: (1) either the information no longer exists (known as "trace-dependent forgetting"), or (2) the information exists, but cannot be retrieved (known as "cue-dependent forgetting"). Trace-dependent forgetting happens when an item is not imprinted strongly enough, if the item has not been successfully consolidated or has become corrupted by other memory items. Cue-dependent forgetting occurs when a retrieval trigger is not associated with the item. It can be difficult to generate cues to trigger a user's recollection of alphanumeric passwords, given the random and arbitrary nature of most alphanumeric passwords. Furthermore, to provide such cues to the user during an authentication process can compromise the security of the authentication process.

The present invention allows users to circumvent the use of conventional alphanumeric passwords that are often difficult to remember. The invention provides image-based passcode authentication systems and methods that are intuitive to users, and that allow users to easily generate, recall, and/or enter their image passcodes. User recollection can be improved with the use of image-based passcodes, and are based on the "picture superiority effect" which describes people's tendencies to remember images more accurately than semantic or syntactic memories. The sequence of images in the passcode may conform to a predefined sentence structure. The use of the predefined sentence structure in conjunction with the image-based passcodes can help to further reinforce a user's recollection.

The image-based passcode authentication systems and methods described herein also provide an alternative to the conventional log-in process to a user's computing device or web account. The conventional log-in process typically requires a user to type and enter the user's alphanumeric password in a log-in window. Using the image-based passcode authentication systems and methods described herein, a user can log in to the user's device or account by sequentially selecting a plurality of images corresponding to the user's passcode, instead of manually typing and entering the user's alphanumeric password. As previously described, the sequence of images are indicative of a sentence that can be easily recalled by the user, or may be of significance to the user such that the passcode (which is a combination of images and words) is imprinted more deeply in the user's memory.

In some instances, a computing device may not readily come with a keyboard, or the computing device may come with a keyboard with foreign language keys. In those instances, it may be more convenient for the user to log in to the user's device or account by sequentially selecting a plurality of images corresponding to the user's passcode, instead of manually typing in an alphanumeric password.

FIG. 1 illustrates an exemplary network layout comprising one or more image-based authentication systems, in accordance with some embodiments. In one aspect, network layout 100 may include a plurality of user devices 102, a server 104, a network 106, one or more databases 108, and one or more authentication systems 110. Each of the components 102, 104, 108, and 110 may be operatively connected to one another via network 106 or any type of communication links that allows transmission of data from one component to another.

A user device may be, for example, one or more computing devices configured to perform one or more operations consistent with the disclosed embodiments. For example, a user device may be a computing device that is capable of executing software or applications provided by one or more authentication systems. In some embodiments, the software and/or applications may provide to a user a plurality of images during an authentication session. The user may be asked to select a sequence of images from among the plurality of images. The selected sequence of images may conform to a predefined sentence structure, and may correspond to a sequence of words. The software and/or applications may compare the sequence of words to the user's passcode stored in a database. When the sequence of words matches the passcode, the user may be successfully authenticated. The image-based passcode is designed to allow the user to recall his/her passcode more easily, compared to the use of conventional alphanumeric passwords. The authentication session may be hosted by the server on one or more interactive webpages, and accessed by one or more users.

A user device can include, among other things, desktop computers, laptops or notebook computers, mobile devices (e.g., smart phones, cell phones, personal digital assistants (PDAs), and tablets), or wearable devices (e.g., smartwatches). A user device can also include any other media content player, for example, a set-top box, a television set, a video game system, or any electronic device capable of providing or rendering data. A user device may include known computing components, such as one or more processors, and one or more memory devices storing software instructions executed by the processor(s) and data.

In some embodiments, the network layout may include a plurality of user devices. Each user device may be associated with a user. Users may include any individual or groups of individuals using software or applications provided by the authentication system. For example, the users may access a user device or a web account using an application programmable interface (API) provided by the authentication system. In some embodiments, more than one user may be associated with a user device. Alternatively, more than one user device may be associated with a user. The users may be located geographically at a same location, for example users working in a same office or a same geographical location. In some instances, some or all of the users and user devices may be at remote geographical locations (e.g., different cities, countries, etc.), although this is not a limitation of the invention.

The network layout may include a plurality of nodes. Each user device in the network layout may correspond to a node. If a "user device 102" is followed by a number or a letter, it means that the "user device 102" may correspond to a node sharing the same number or letter. For example, as shown in FIG. 1, user device 102-1 may correspond to node 1 which is associated with user 1, user device 102-2 may correspond to node 2 which is associated with user 2, and user device 102-k may correspond to node k which is associated with user k, where k may be any integer greater than 1.

A node may be a logically independent entity in the network layout. Therefore, the plurality of nodes in the network layout can represent different entities. For example, each node may be associated with a user, a group of users, or groups of users. For example, in one embodiment, a node may correspond to an individual entity (e.g., an individual). In some particular embodiments, a node may correspond to multiple entities (e.g., a group of individuals).

A user may be registered or associated with an entity that provides services associated with one or more operations performed by the disclosed embodiments. For example, the user may be a registered user of an entity (e.g., a company, an organization, an individual, etc.) that provides one or more of servers 104, databases 108, and/or authentication systems 110 for image-based user authentication consistent with certain disclosed embodiments. The disclosed embodiments are not limited to any specific relationships or affiliations between the users and an entity, person(s), or entities providing server 104, databases 108, and authentication systems 110.

A user device may be configured to receive input from one or more users. A user may provide an input to a user device using an input device, for example, a keyboard, a mouse, a touch-screen panel, voice recognition and/or dictation software, or any combination of the above. The input may include a user performing various virtual actions during an authentication session. The input may include, for example, a user selecting a sequence of images from a plurality of images that are presented to the user during an authentication session. Different users may provide different input by selecting different sequences of images corresponding to different passcodes. In some cases, a user can use a same sequence of images or different sequences of images to access a plurality of user devices and/or web accounts. In other cases, a user can use a same sequence of images or different sequences of images to access different user devices and/or web accounts. In certain instances, some users may have different usernames but same image-based passcodes. Any combination of usernames and passcodes may be contemplated, although it should be noted that each username/passcode corresponds to a unique authentication key associated with that particular user.

In the embodiment of FIG. 1, two-way data transfer capability may be provided between the server and each user device. The user devices can also communicate with one another via the server (i.e., using a client-server architecture). In some embodiments, the user devices can communicate directly with one another via a peer-to-peer communication channel. The peer-to-peer communication channel can help to reduce workload on the server by utilizing resources (e.g., bandwidth, storage space, and/or processing power) of the user devices.

A server may comprise one or more server computers configured to perform one or more operations consistent with disclosed embodiments. In one aspect, a server may be implemented as a single computer, through which a user device is able to communicate with other components of the network layout. In some embodiments, a user device may communicate with the server through the network. In other embodiments, the server may communicate on behalf of a user device with the authentication system(s) or the database through the network. In some embodiments, the server may embody the functionality of one or more authentication system(s). In some embodiments, the authentication system(s) may be implemented inside and/or outside of the server. For example, the authentication system(s) may be software and/or hardware components included with the server or remote from the server.

In some embodiments, a user device may be directly connected to the server through a separate link (not shown in FIG. 1). In certain embodiments, the server may be configured to operate as a front-end device configured to provide access to one or more authentication system(s) consistent with certain disclosed embodiments. The server may, in some embodiments, utilize the authentication system(s) to process input data from a user device in order to compare and match the user's selected sequence of images to a pre-stored sequence of images for authentication purposes. The server may be configured to store the users' passcode data in the database. The server may also be configured to search, retrieve, and analyze (compare) passcode data and log-in information stored in the database. In some cases, the data and information may include a user's previous log-in attempts using the image-based passcodes.

A server may include a web server, an enterprise server, or any other type of computer server, and can be computer programmed to accept requests (e.g., HTTP, or other protocols that can initiate data transmission) from a computing device (e.g., a user device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods disclosed herein can be implemented in hardware components or combinations of hardware and software such as, for example, ASICs, special purpose computers, or general purpose computers. While FIG. 1 illustrates the server as a single server, in some embodiments, multiple devices may implement the functionality associated with the server.

The network may be configured to provide communication between various components of the network layout depicted in FIG. 1. The network may be implemented, in some embodiments, as one or more networks that connect devices and/or components in the network layout for allowing communication between them. For example, as one of ordinary skill in the art will recognize, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network may be implemented using cell and/or pager networks, satellite, licensed radio, or a combination of licensed and unlicensed radio. The network may be wireless, wired, or a combination thereof.

The authentication system(s) may be implemented as one or more computers storing instructions that, when executed by one or more processor(s), generate a plurality of images from which a user can select a sequence of images corresponding to the user's passcode, and whereby the sequence of images conform to a sentence structure that is predefined by the system and/or an administrator of the system. The sequence of images may correspond to a sequence of words. The authentication system(s) may compare the sequence of words to a pre-stored sequence of words indicative of the user's passcode, and to successfully authenticate the user when the sequence of words matches the pre-stored sequence of words. The authentication system(s) may further generate and display different images to the user during different authentication sessions, whereby two or more different images may be indicative of a same word in the user's passcode. In some embodiments, the server may be the computer in which the authentication system(s) are implemented.

However, in some embodiments, at least some of the authentication system(s) may be implemented on separate computers. For example, a user device may send a user input to the server, and the server may connect to other authentication system(s) over the network. In some embodiments, the authentication system(s) may comprise software that, when executed by processor(s), perform processes for authenticating users based on the users' selection of sequences of images in conformance with a predefined sentence structure.

The server may access and execute the authentication system(s) to perform one or more processes consistent with the disclosed embodiments. In certain configurations, the authentication system(s) may be software stored in memory accessible by the server (e.g., in a memory local to the server or remote memory accessible over a communication link, such as the network). Thus, in certain aspects, the authentication system(s) may be implemented as one or more computers, as software stored on a memory device accessible by the server, or a combination thereof. For example, one authentication system may be computer hardware executing one or more image-based authentication techniques, and another authentication system may be software that, when executed by the server, performs one or more image-based authentication techniques.

The authentication system(s) can be used to authenticate users in a variety of different ways. For example, the authentication system(s) may store and/or execute software that performs an algorithm for authenticating a user based on the user's selection of a sequence of images presented to the user. The authentication system(s) may also store and/or execute software that performs an algorithm for generating user image-based passcodes having a predefined sentence structure. The authentication system(s) may further store and/or execute software that performs an algorithm for dynamically modifying the images presented to a user during each authentication session.

The disclosed embodiments may be configured to implement the authentication system(s) such that a variety of algorithms may be performed for performing one or more image-based authentication techniques. Although a plurality of authentication systems have been described for performing the above algorithms, it should be noted that some or all of the algorithms may be performed using a single authentication system, consistent with disclosed embodiments.

The user devices, the server, and the authentication system(s) may be connected or interconnected to one or more database(s). The database(s) may be one or more memory devices configured to store data (e.g., sentence structures, sentence elements, words and images for each sentence element, etc.). Additionally, the database(s) may also, in some embodiments, be implemented as a computer system with a storage device. In one aspect, the database(s) may be used by components of the network layout to perform one or more operations consistent with the disclosed embodiments. In certain embodiments, one or more the database(s) may be co-located with the server, or may be co-located with one another on the network. One of ordinary skill will recognize that the disclosed embodiments are not limited to the configuration and/or arrangement of the database(s).

Any of the user devices, the server, the database(s), and/or the authentication system(s) may, in some embodiments, be implemented as a computer system. Additionally, while the network is shown in FIG. 1 as a "central" point for communications between components of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate. Additionally, while some disclosed embodiments may be implemented on the server, the disclosed embodiments are not so limited. For instance, in some embodiments, other devices (such as one or more user devices) may be configured to perform one or more of the processes and functionalities consistent with the disclosed embodiments, including embodiments described with respect to the server and the authentication system.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Figure 2:
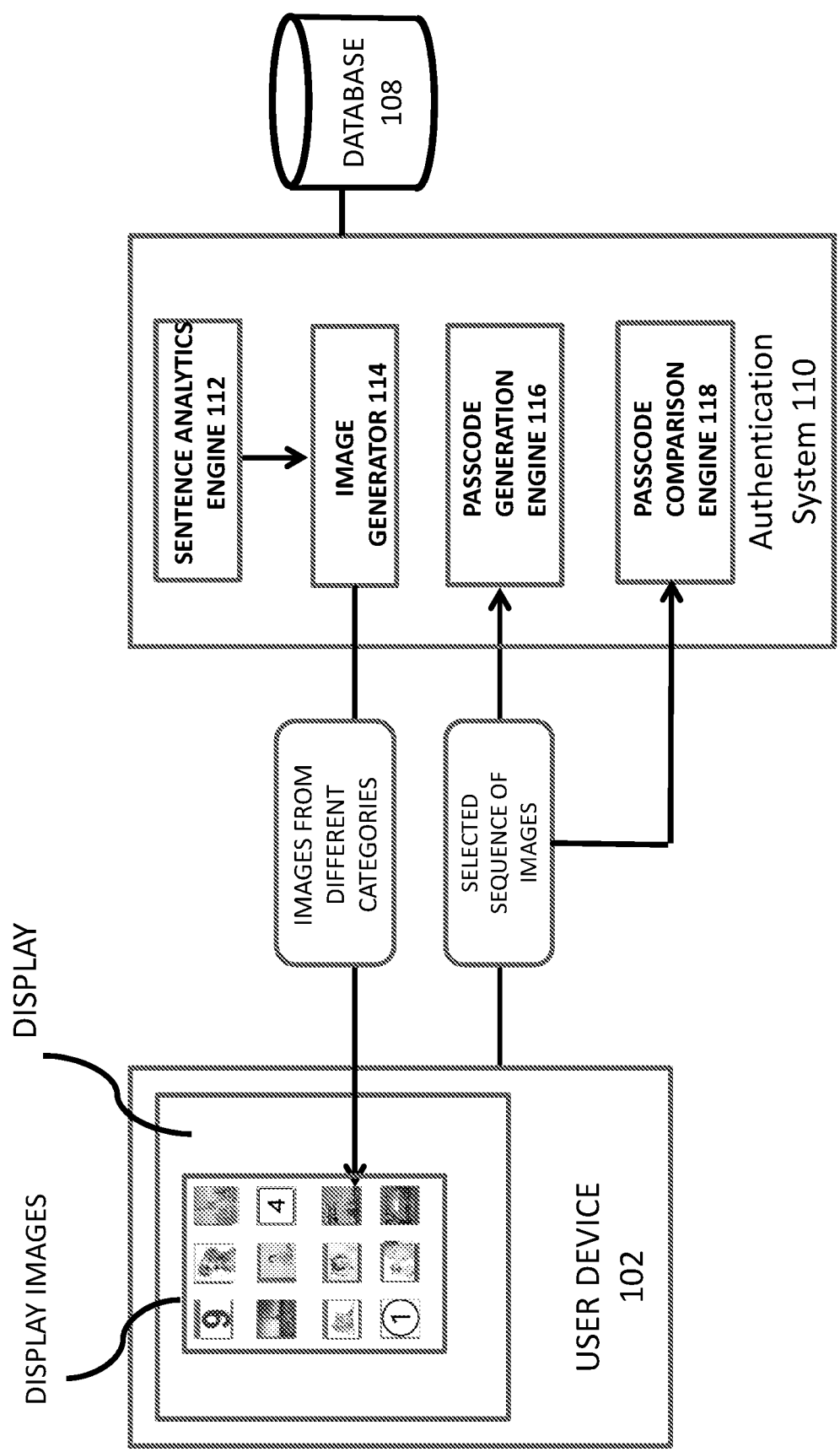
FIG. 2 shows a schematic block diagram of exemplary components in an authentication system and the communications thereof with a user device, in accordance with some embodiments.

FIG. 2 illustrates a schematic block diagram of exemplary components in an image-based authentication system and the communications with a user device, in accordance with some embodiments. As previously described, the authentication system may be implemented inside and/or outside of a server. For example, the authentication system may be software and/or hardware components included with the server, or remote from the server. Although FIG. 2 illustrates the user device and the authentication system as separate components, it shall be appreciated that the authentication system can also be implemented as software and/or hardware components included with the user device.

Referring to FIG. 2, an authentication system 110 may include a sentence analytics engine 112, an image generator 114, a passcode generation engine 116, and a passcode comparison engine 118. The authentication system may be configured to receive user passcode authentication information from one or more users.

Figure 3:
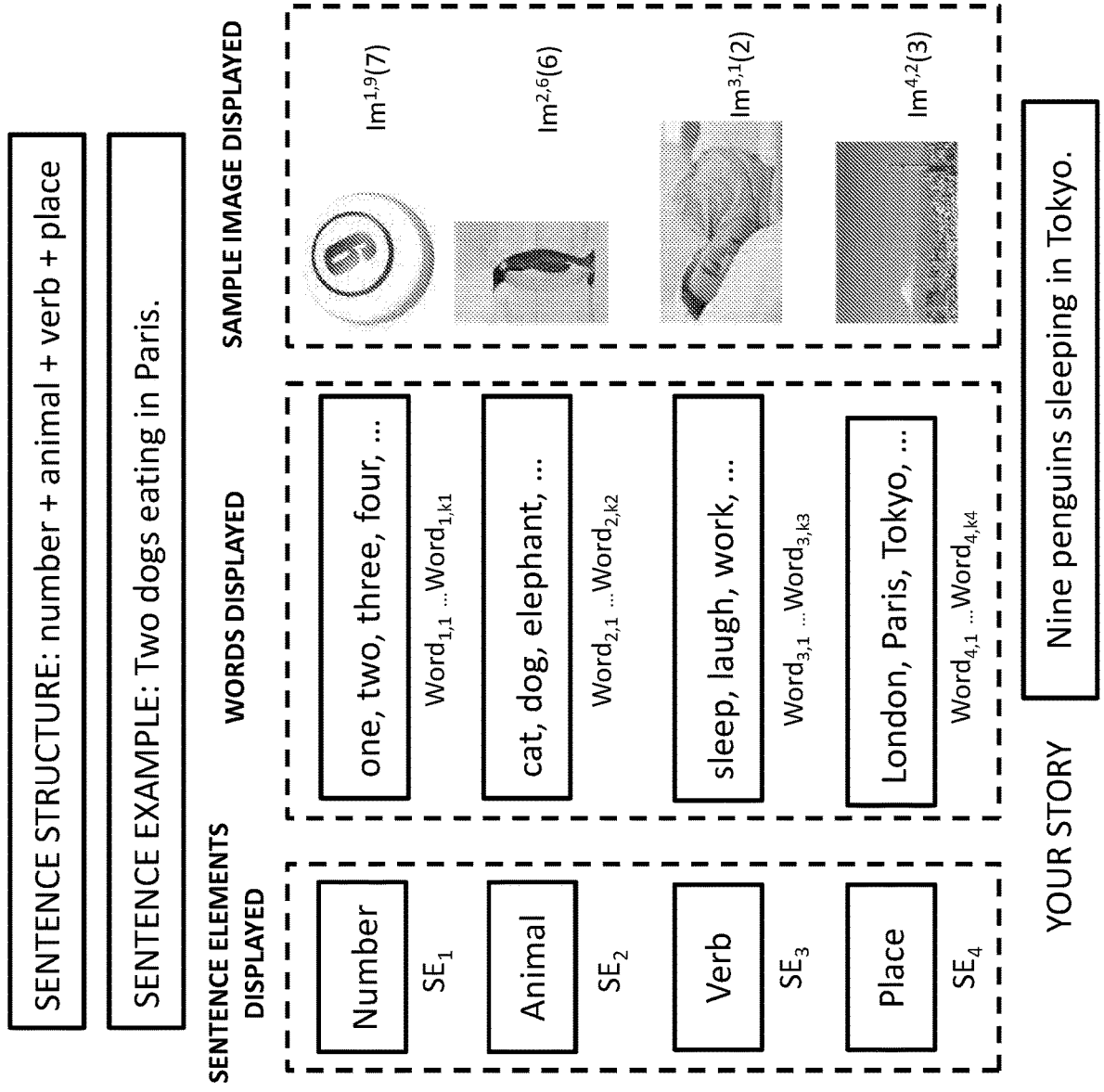
FIG. 3 shows an example of a sentence structure that is used in an image-based passcode, in accordance with some embodiments.

The sentence analytics engine 112 may be configured to generate a sentence structure that defines the rules for image-based passcode generation. A user may be asked to generate an image-based passcode that conforms to a sentence structure, as described in more detail below. The sentence structure may comprise any number of sentence elements that can be used to construct a sentence. A sentence element as used herein may be referred to interchangeably as a sentence component. A sentence element may be a grammatical word or a phrase. Each sentence element may belong to a different category. Alternatively, two or more sentence elements may belong to a same category. Examples of categories may include nouns, verbs, adjectives, and various object classes (e.g., animals, places, numbers, etc.). As shown in FIG. 3, an exemplary sentence structure may comprise four sentence elements. For example, a first sentence element $SE_1$ may correspond to a word from a number category, a second sentence element $SE_2$ may correspond to a word from an animal category, a third sentence element $SE_3$ may correspond to a word from a verb category, and a fourth sentence element $SE_4$ may correspond to a word from a place category.

FIG. 3 further illustrates an example of a sentence having the above structure: "Two dogs eating in Paris." The words "two," "dogs," "eating," and "Paris" in the sentence respectively correspond to the first element ("number"), second element ("animal"), third element ("verb"), and fourth element ("place"). In some cases, the sentence example may be provided to a user via a graphical user interface (GUI) for displaying data on a user device. For example, a window may appear in the GUI prompting the user to generate a passcode having the above sentence structure (e.g., number+animal+verb+place), using the sentence example as a reference.

Examples of GUIs and/or graphical elements are illustrated in FIGS. 2, 3, 4, 7, 9, 10, and 11. As previously described, a user device may be a computing device that can display one or more webpages. A user device can include, among other things, desktop computers, laptops or notebook computers, mobile devices (e.g., smart phones, cell phones, personal digital assistants (PDAs), and tablets), and wearable devices (e.g., smartwatches). A user device can also include any other media content player, for example, a set-top box, a television set, a video game system, or any electronic device capable of providing or rendering data. A user device may include known computing components, such as one or more processors, and one or more memory devices storing software instructions executed by the processor(s) and data. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in a software, a software application, a web browser, etc. Links may be generated through an application programming interface (API) which is a set of routines, protocols, and tools for building software applications.

Images from different categories (associated with different words and sentence elements) may be stored in one or more databases. The image generator may be configured to select a plurality of images for each category and transmit the images to the user for display on the GUI. The images for each category may be provided sequentially to the user, so that the user can select a sequence of images that conforms to the sentence structure, and that corresponds to the user's desired passcode. The image generator 114 may be configured to generate carousels of different images that are indicative of the different sentence elements, for example as shown in FIG. 4.

Figure 4:
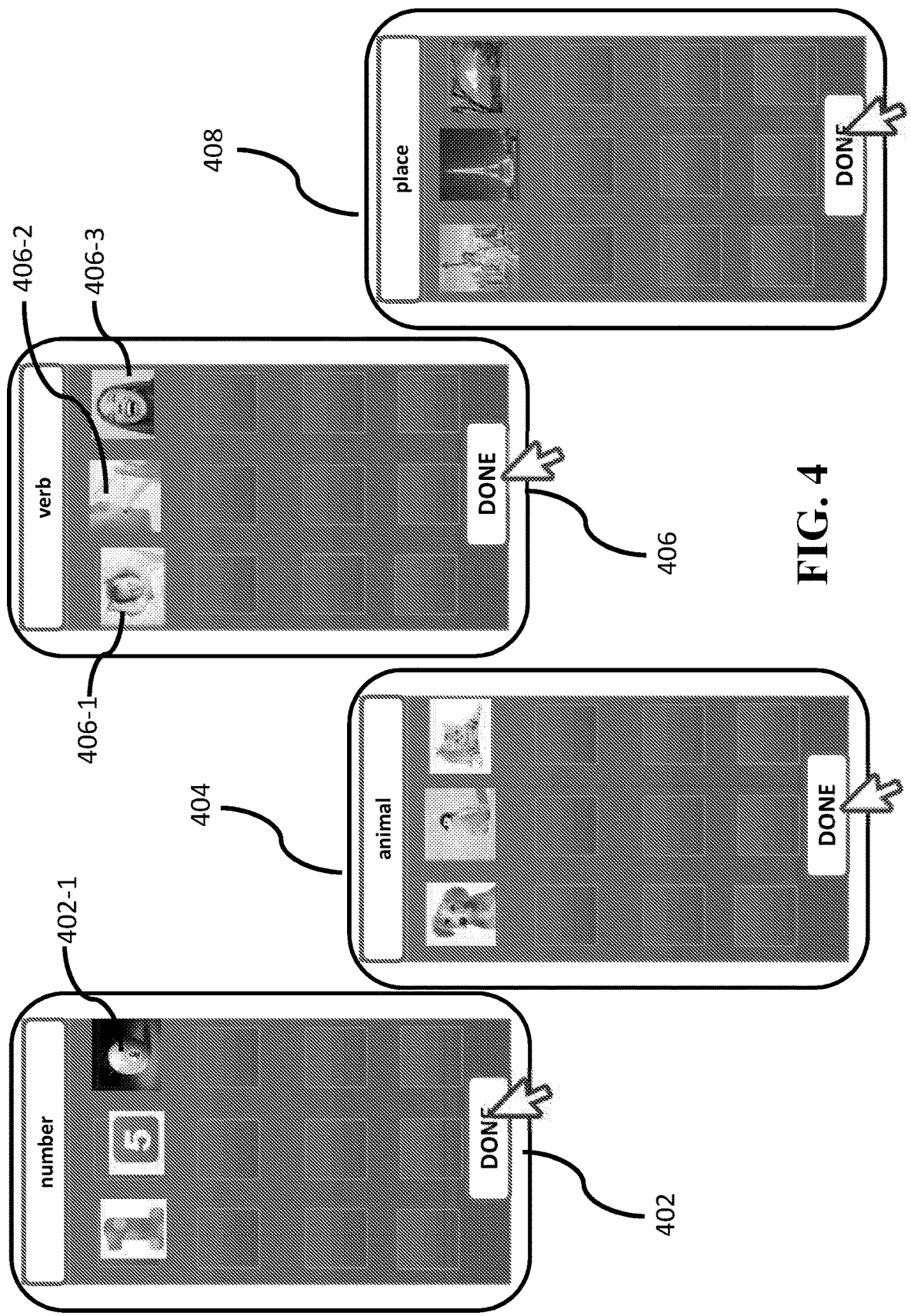
FIG. 4 shows examples of different carousels displaying images in each category to a user during a passcode generation step, in accordance with some embodiments.

Referring to FIG. 4, the image generator 114 may be configured to generate a first carousel 402 comprising different images that are indicative of the first sentence element ("number"). For example, the first carousel may include images of numbers zero to n, where n may be an integer or a non-integer. In some cases, n may be the number nine, such that images of numbers ranging from zero to nine (ten numbers) are displayed in the first carousel. Optionally, n may be less than nine or greater than nine. Any value for n may be contemplated. In the example of FIG. 4, only the numbers one, five, and nine are depicted in the first carousel, although this is not a limitation of the invention. The images may be of a same object class or different object classes. In some cases, the images may be computer-generated images of numbers ranging from zero to nine. Alternatively, some of the images may be actual photographs illustrative of the numbers. For example, as shown in FIG. 4, the number nine may be depicted by a photograph 402-1 of a billiard ball having the number nine.

After a user has selected a number (e.g., nine) from the first carousel, the user may be presented with a second carousel 404. The image generator may be configured to generate the second carousel 404 comprising different images that are indicative of the second sentence element ("animal"). The second carousel may include images of different animals, for example x number of different animals. In some cases, x may be twenty such that images of twenty different types of animals are displayed in the second carousel. Optionally, x may be less than twenty or greater than twenty. Any value for x may be contemplated. In the example of FIG. 4, only the animals "dog," "penguin," and "cat" are depicted in the second carousel, although this is not a limitation of the invention. The images may be of a same object class or different object classes. In some cases, the images may be computer-generated images of animals. Alternatively, some of the images may be actual photographs of the animals.

After a user has selected an animal (e.g., penguin) from the second carousel, the user may be presented with a third carousel 406. The image generator may be configured to generate the third carousel 406 comprising different images that are indicative of the third sentence element ("verb"). The third carousel may include images of different actions, for example y number of different actions. In some cases, y may be twenty such that images of twenty different types of actions are displayed in the third carousel. Optionally, y may be less than twenty or greater than twenty. Any value for y may be contemplated. The images may be of a same object class or different object classes. In some cases, the images may be computer-generated images that convey meaning of the action verbs. Alternatively, some of the images may be actual photographs that convey meaning of the action verbs. In the example of FIG. 4, only the verbs/actions "sleeping," "drinking," and "laughing" are depicted in the third carousel, although this is not a limitation of the invention. The verb "sleeping" may be illustrated by a photograph 406-1 of a sleeping baby. The verb "drinking" may be illustrated by a photograph 406-2 of a person drinking from a glass. The verb "laughing" may be illustrated by a photograph 406-3 of a girl laughing.

After a user has selected a verb (e.g., sleeping) from the third carousel, the user may be presented with a fourth carousel 408. The image generator may be configured to generate the fourth carousel 408 comprising different images that are indicative of the fourth sentence element ("place"). The fourth carousel may include images of different places, for example z number of different actions. In some cases, z may be twenty such that images of twenty different places are displayed in the fourth carousel. Optionally, z may be less than twenty or greater than twenty. Any value for z may be contemplated. The images may be of a same object class or different object classes. In some cases, the images may be computer-generated images of the places. Alternatively, some of the images may be actual photographs of the places. In the example of FIG. 4, only the places "New York city," "Paris," and "Tokyo" are depicted in the fourth carousel, although this is not a limitation of the invention. The places may be illustrated by architectural landmarks at those places. For example, the place "New York city" may be illustrated by a photograph of the Statue of Liberty; the place "Paris" may be illustrated by a photograph of the Eiffel Tower; and the place "Tokyo" may be illustrated by a photograph of Mount Fuji.

After a user has selected a place (e.g., Tokyo) from the fourth carousel, the passcode generation engine may be configured to generate a passcode for the user based on the selected sequence of the images. In the above example, since the user has selected the number "nine" from the first carousel, the animal "penguin" from the second carousel, the verb "sleeping" from the third carousel, and the place "Tokyo" from the fourth carousel, the passcode generation engine may be configured to generate a passcode for the user, whereby the passcode is associated with the following sentence (or "story"): "Nine penguins sleeping in Tokyo" In some embodiments, the user's passcode may be displayed in the GUI on the user device in textual and/or image form, to show the user the passcode that he/she had selected. For example, the passcode generation engine may be configured to display the text/passcode "Nine penguins sleeping in Tokyo" on the user device. Additionally, the passcode generation engine may display a sequence of sample images that are illustrative of the selected words in the passcode (e.g., a billiard ball showing the number nine, a standing penguin, a person sleeping, and a photograph of Tokyo with Mount Fuji in the background).

It should be noted that any combination of passcodes can be generated by a user selecting different images from the carousels during the passcode generation step. A user can generate an image-based passcode that tells a "story." Some studies have found that people may remember things better when humor is added. Accordingly, a user can generate whimsical and humorous image-based passcodes (e.g., "seven pigs splashing in mud in London," or "three elephants kissing in Paris") that tell a "story," and that can be easily recalled by the user.

In some embodiments, instead of a user selecting a plurality of images from different carousels to form an image-based passcode, the user may alternatively enter a sentence or a phrase into a passcode enrollment window on a user device. The sentence analytics engine 112 may be configured to analyze the sentence or phrase, extract words from the sentence or phrase, and determine the category and type of images associated with each word. For example, a user may enter the passcode ""Nine penguins sleeping in Tokyo" into a passcode enrollment window. The passcode generation engine 116 may be configured to store the above passcode in a database. In some instances, the passcode generation engine may display a sequence of sample images that are illustrative of the selected sentence phrase (e.g., a billiard ball showing the number nine, a standing penguin, a person sleeping, and a photograph of Tokyo with Mount Fuji in the background).

Figure 5:
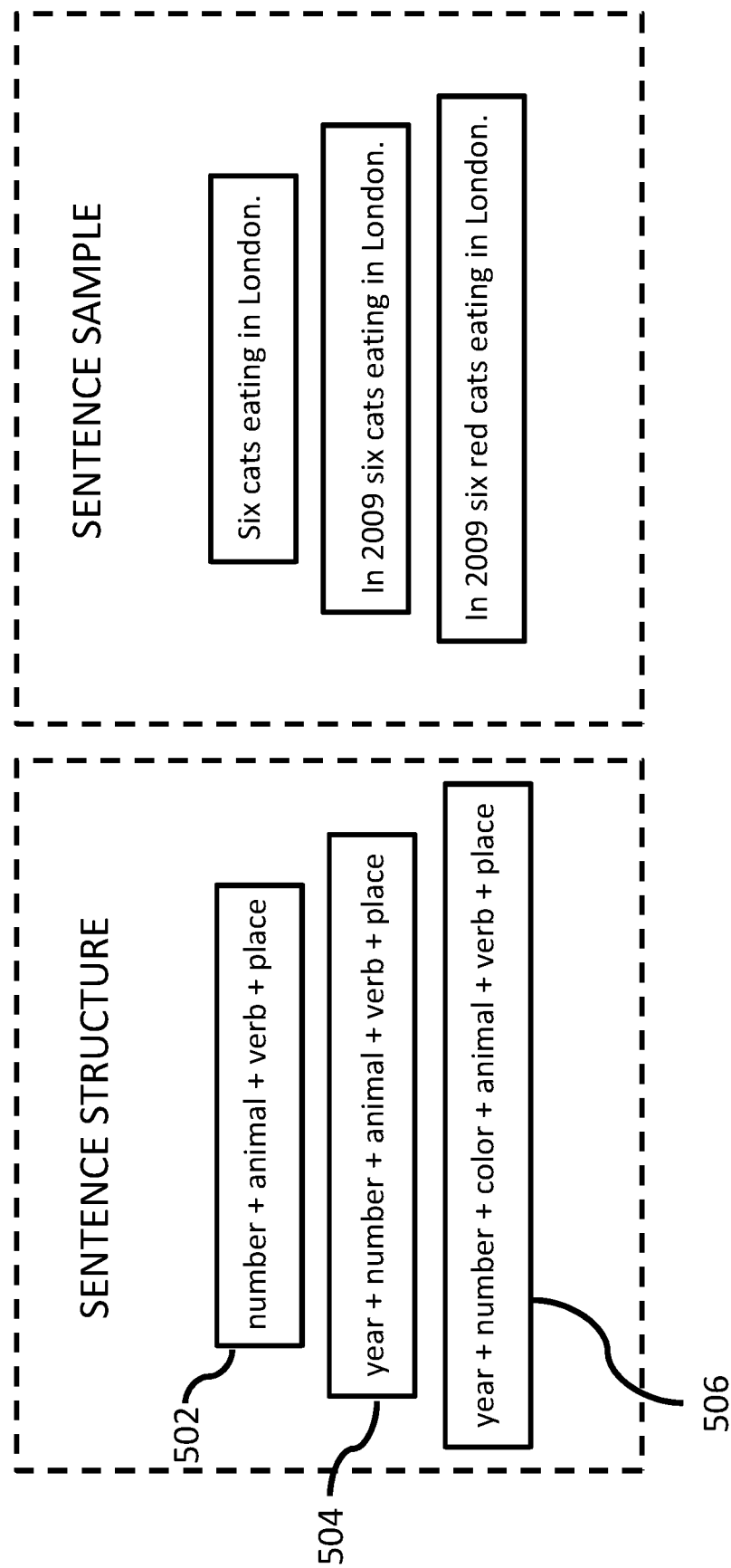
FIG. 5 shows additional examples of sentence structures, in accordance with some embodiments.

As previously noted, a sentence structure for an image-based passcode need not be limited to four sentence elements. In some embodiments, a sentence structure can have fewer than four sentence elements. In other embodiments, a sentence structure can have more than four sentence elements. Any number of sentence elements in a sentence structure may be contemplated. FIG. 5 illustrates examples of sentence structures for image-based passcodes that have more than four sentence elements, in accordance with some embodiments. An existing sentence structure can be modified by adding any number of sentence elements anywhere within the sentence structure. Referring to FIG. 5, a sentence structure 502 may be the same as the sentence structure shown in FIG. 3. An example of a sentence having the structure 502 is given by: "Six cats eating in London."

In some embodiments, the sentence analytics engine may be configured to increase the complexity of the sentence structure, for example to meet more stringent authentication requirements and/or to increase the strength of the passcode. The complexity of the sentence structure can be increased by modifying the sentence to include one or more additional sentence elements. For example, in FIG. 5, the sentence structure 502 can be modified to structure 504 by adding a fifth sentence element (associated with a temporal element "year"). An example of a sentence having the modified structure 504 is given by: "In 2009 six cats eating in London." Accordingly, during the passcode generation step, a user may be presented with a fifth carousel (not shown) before the first carousel for number. The image generator may be configured to generate the fifth carousel comprising different images that are indicative of the fifth sentence element ("year"). The fifth carousel may include images of different years, for example p number of different years. Any value for p may be contemplated. The images may be of a same object class or different object classes. In some cases, the images may be computer-generated images that are illustrative of a calendar year. Alternatively, some of the images may be actual photographs of objects illustrative of calendar years (e.g., photographs of a physical wall calendar).

In some embodiments, the sentence structure 504 can be further modified to structure 506 by adding a sixth sentence element (associated with "color"). An example of a sentence having the modified structure 506 is given by: "In 2009 six red cats eating in London." Accordingly, during the passcode generation step, a user may be presented with a sixth carousel (not shown) after the first carousel for number and before the second carousel for animals. The image generator may be configured to generate the sixth carousel comprising different images that are indicative of the sixth sentence element ("color"). The sixth carousel may include images of different colors, for example q number of different colors. Any value for q may be contemplated. The images may be of a same object class or different object classes. In some cases, the images may be computer-generated images that are illustrative of different colors. Alternatively, some of the images may be actual photographs of physical objects having different colors.

In some embodiments, two or more sentence elements can be subsumed into a single category or a single image. For example, an image from the second carousel or the sixth carousel may display red-colored cats associated with the sixth sentence element ("color") and the second sentence element ("animal").

Figure 6:
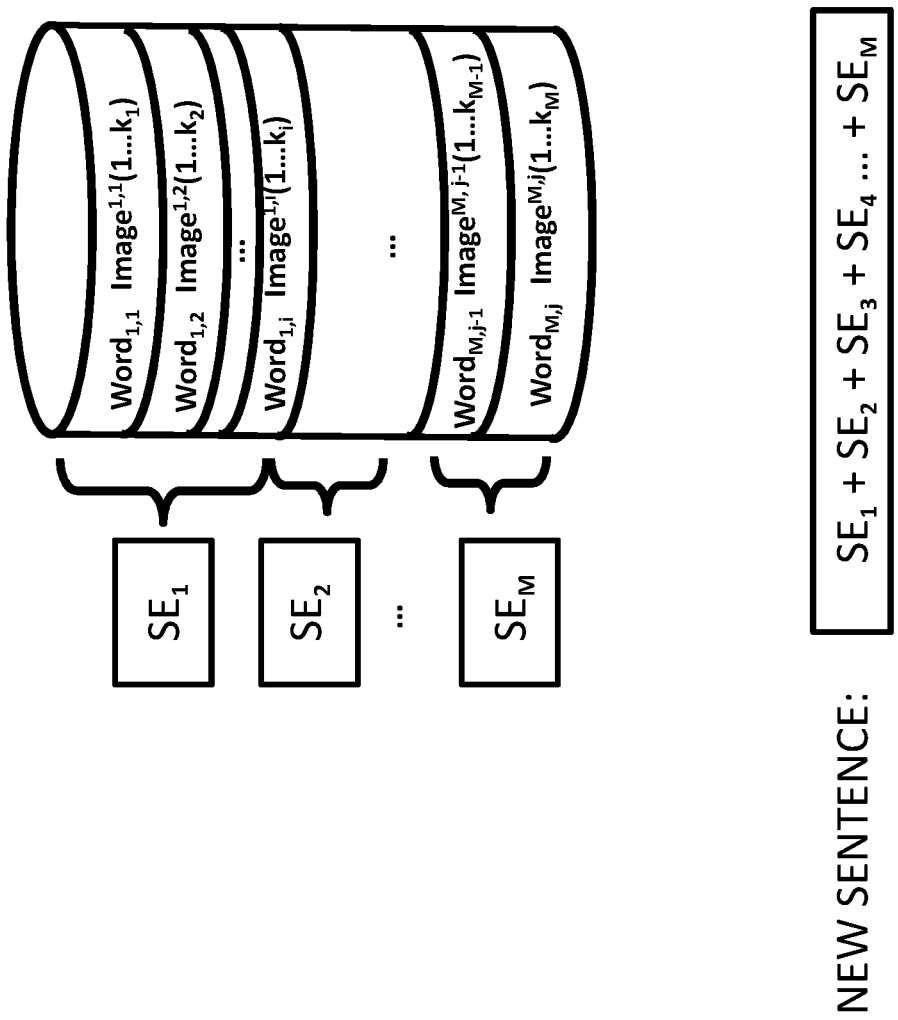
FIG. 6 shows a plurality of sentence elements comprising a plurality of words and images that are stored in a database, in accordance with some embodiments.

FIG. 6 illustrates a database configured to store a plurality of different sentence elements, and a plurality of different words and images that are associated with each sentence element. A sentence structure for an image-based passcode may comprise m number of sentence elements, where m may be any integer. Each sentence element may comprise one or more words. A first sentence element $SE_1$ may comprise a word (1,1), word (1, 2), to word (1, i), where i may be an integer. For example, when the first sentence element $SE_1$ is a number, the word (1,1) may be the number "one," the word (1,2) may be the number "two," and so forth. The number "one" may correspond to the first word in the number category, the number "two" may correspond to the second word in the number category, and so forth. Similarly, when the second sentence element $SE_4$ is a place, the word (4,1) may correspond to a first place "New York City," the word (4,2) may correspond to a second place "Tokyo," and so forth. The place "New York City" may correspond to the first word in the place category, the place "Tokyo" may correspond to the second word in the place category, and so forth.

Figure 7:
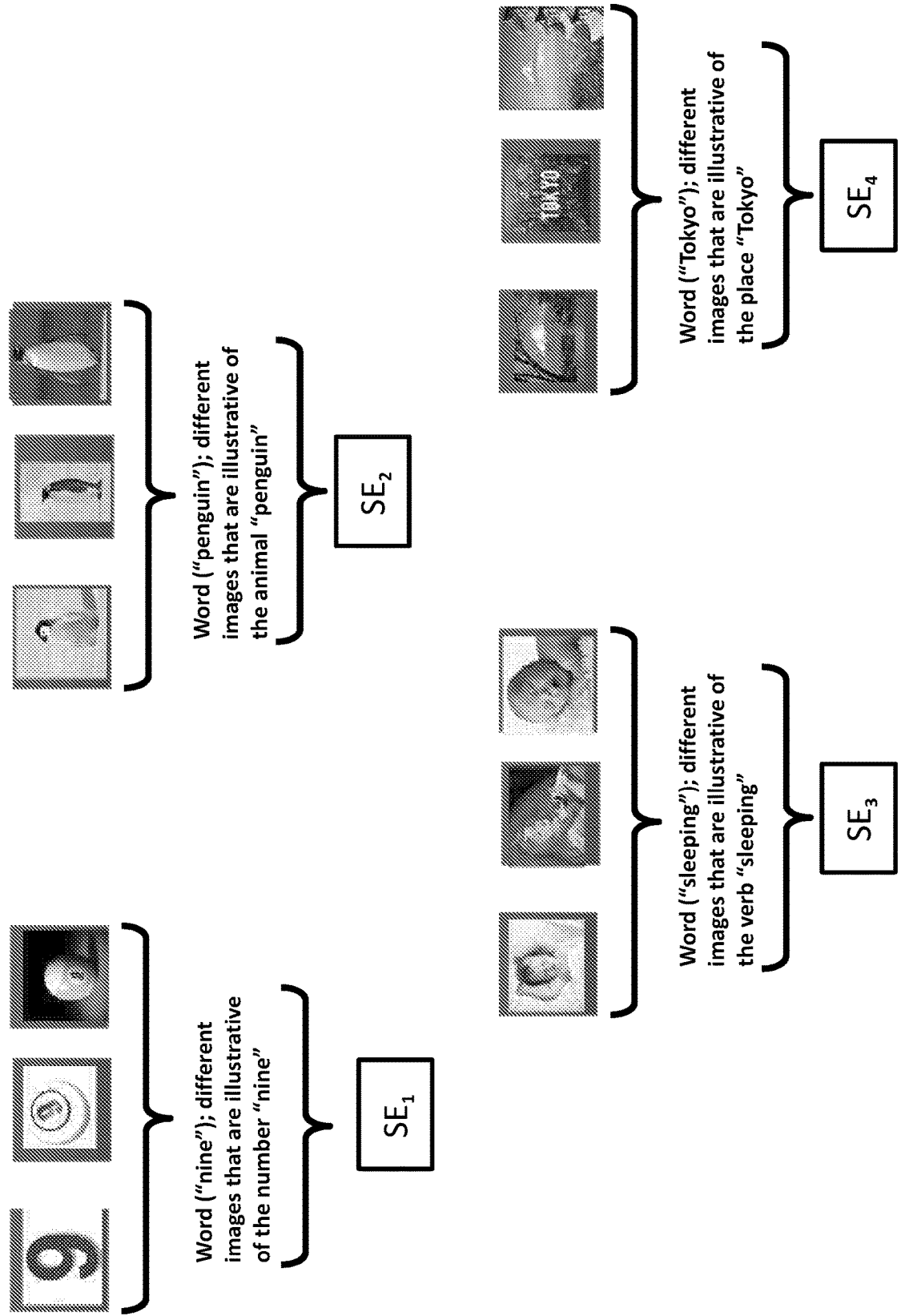
FIG. 7 shows that each word in a sentence element may comprise different images associated with the same word, in accordance with some embodiments.

Each word may have a plurality of different images (1 through k) associated with the word. For example, as shown in FIG. 7, each of the words ("nine," "penguin," "sleeping," and "Tokyo") corresponding to the first through fourth sentence elements ($SE_1$ through $SE_4$) may comprise a plurality of images that are indicative of the same word. A different image of the same word can be presented to the user during each unique authentication session, as described later in FIG. 11. By dynamically changing the images for different authentication sessions, the security level of the systems and methods described herein can be improved.

Figure 8:
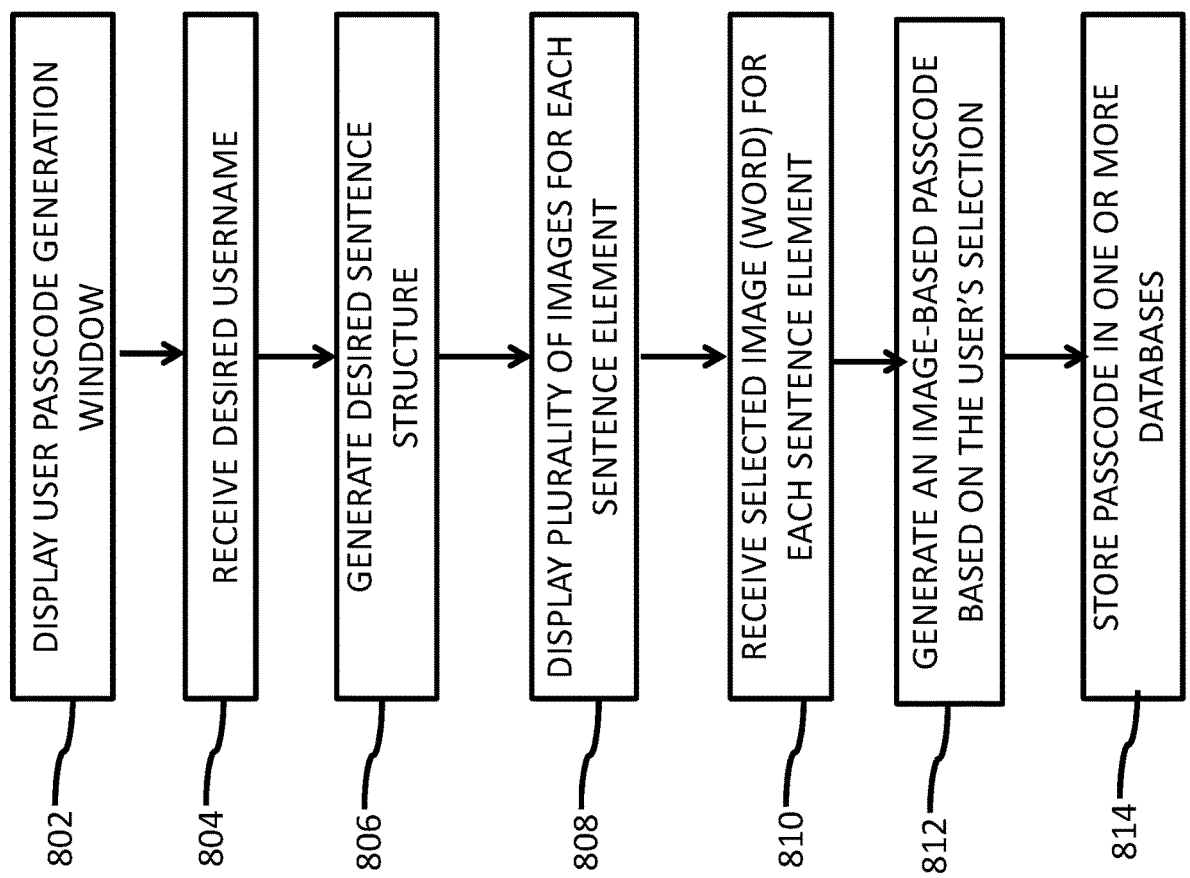
FIG. 8 shows a flowchart of a method for generating an image-based passcode, in accordance with some embodiments.

FIG. 8 illustrates an exemplary method whereby a user can generate an image-based passcode based on a given sentence structure, in accordance with some embodiments. First, a user passcode generation window may be displayed on a user device, for example in a GUI on the user device (Step 802). The user passcode generation window may be provided by the authentication system to allow a user to generate log-in credentials for the user device, an application on the user device, and/or a web account displayable via an Internet browser on the user device. The authentication system may receive a desired username of the user through the user device (Step 804). Next, the authentication system may generate a sentence structure to which the user's (to-be-generated) passcode is to conform (Step 806). As previously described, the sentence structure may comprise a plurality of sentence elements. Next, the authentication system may display a plurality of images for each sentence element in different carousels (Step 808). In some instances, the authentication system may also display a text proximate to the image, to indicate the word that the image is supposed to convey. Next, the authentication system may receive a selected image (word) corresponding to each sentence element based on the user's selection of the images (Step 810). Next, the authentication system may generate an image-based passcode for the user based on the user's selection (Step 812), and store the passcode in one or more databases (Step 814).

Figure 9:
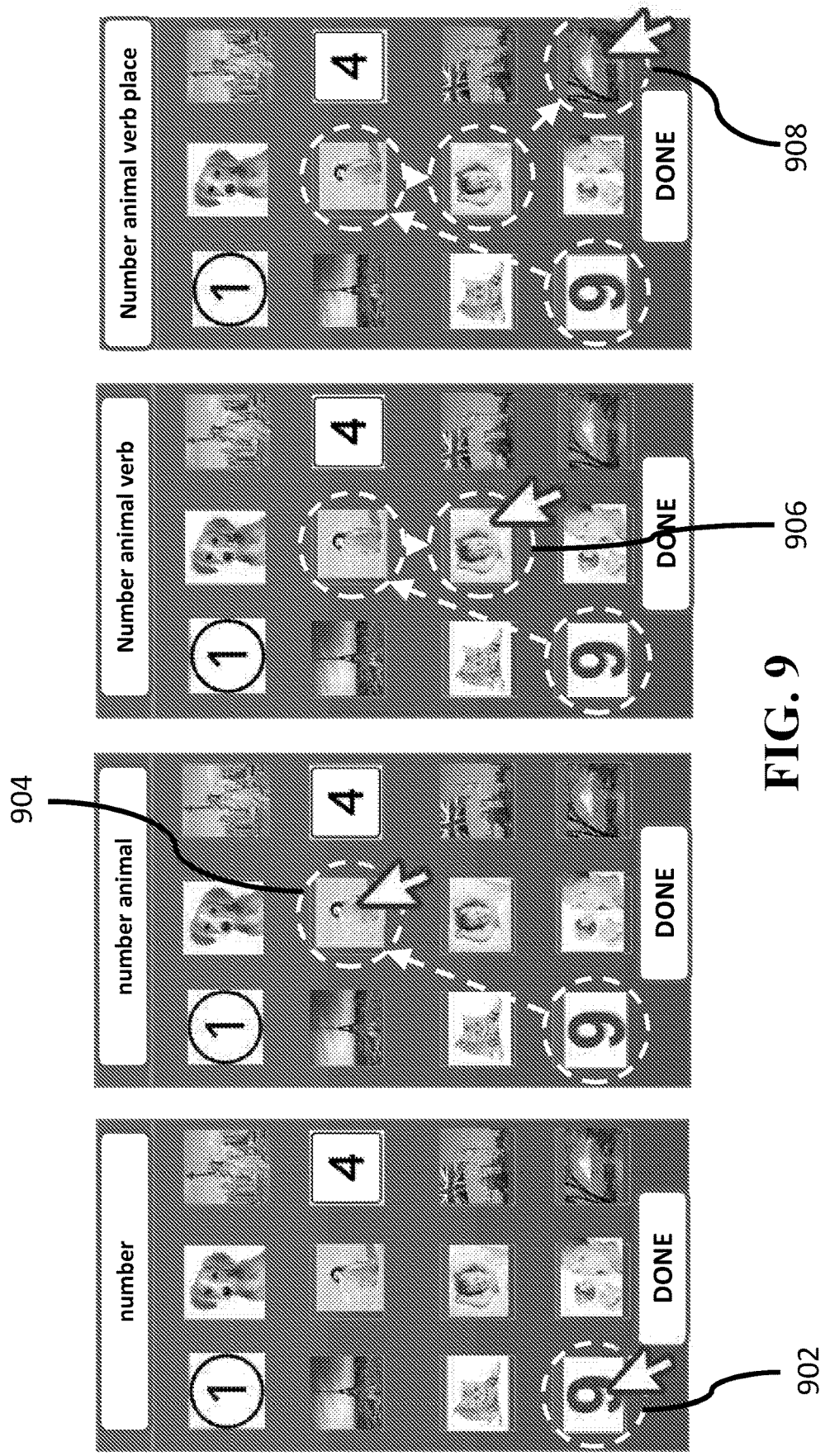
FIG. 9 shows a user selection of a sequence of images during an authentication session, in accordance with some embodiments.
Figure 10:
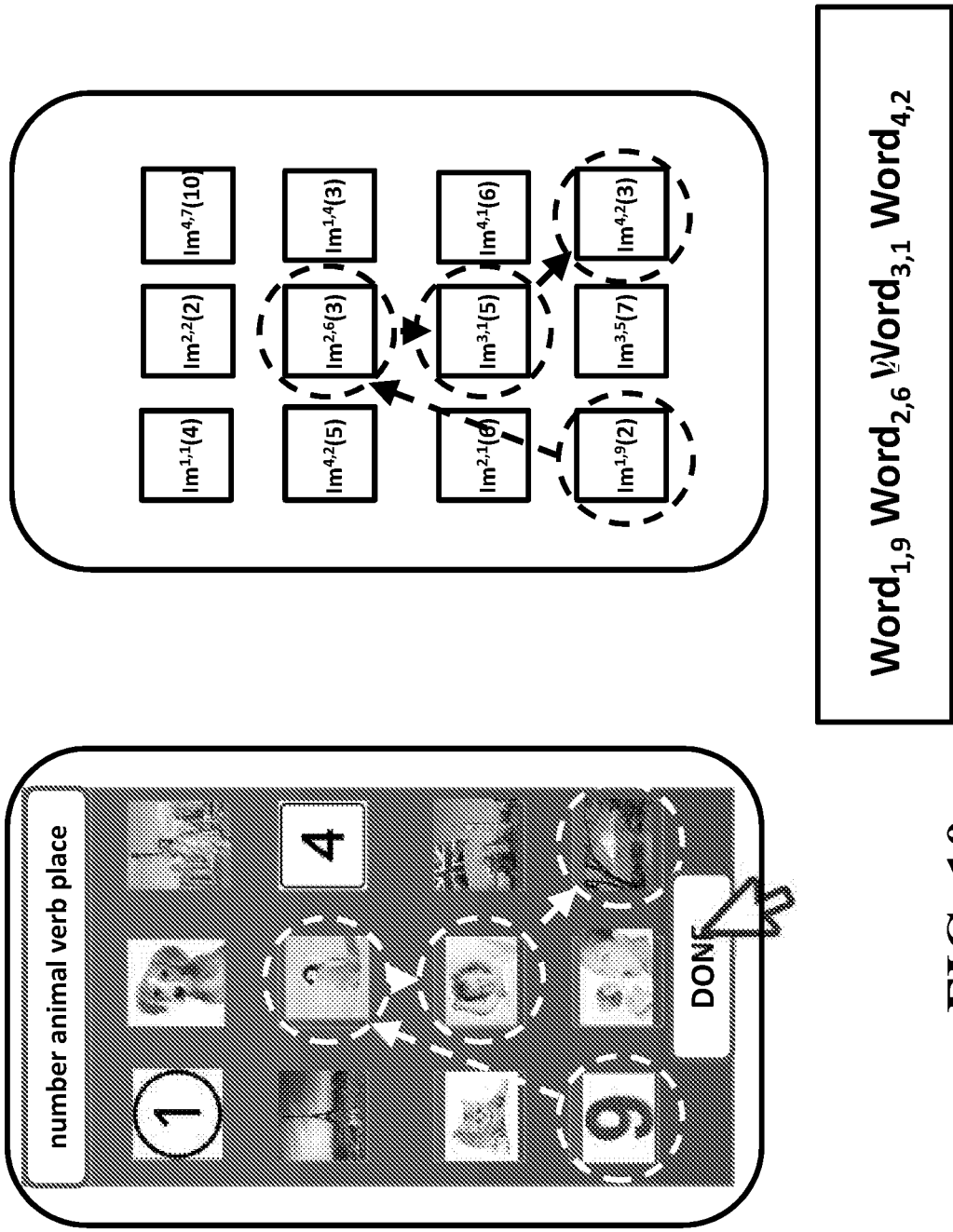
FIG. 10 shows the mapping of the selected sequence of images to words and sentence elements in a sentence structure, in accordance with some embodiments.

After a user has successfully generated an image-based passcode via the steps in FIG. 8, the user can subsequently log in to a device or web account using the image-based passcode. In the example of FIGS. 9 and 10, the user's image-based passcode may be a sequence of images that is indicative of the following sentence or "story": "Nine penguins sleeping in Tokyo" Accordingly, the user may select the images in the order shown (902, 904, 906, and then 908). The first image 902 corresponds to the number "nine" for the first sentence element; the second image 904 corresponds to the animal "penguin" for the second sentence element; the third image 906 corresponds to the verb "sleeping" for the third sentence element; and the fourth image 908 corresponds to the place "Tokyo" for the fourth sentence element. After the user has selected the sequence of images, the user may click on the "Done" button. The passcode comparison engine 118 then analyzes the user's selection of the sequence of images to determine whether the user's selection matches the predefined sentence structure, and whether the user's selection matches the user-generated passcode that is pre-stored in the database. The user may be granted access to the device and/or web account upon successful authentication of the user. In some instances, the user interface on the user device need not include the "Done" button, and the passcode comparison engine can automatically compare in real-time the user's selection of the sequence of images to the pre-stored version of the user-generated passcode, and to successfully authenticate the user once the user's selection matches the pre-stored version of the user-generated passcode.

In some embodiments, during subsequent authentication sessions, a user may or may not see the same images that he/she had previously selected during the passcode generation step. For example, as shown in parts A, B, and C of FIG. 11, different images that are indicative of a selected word for each sentence element may be presented to the user each time the user initiates an authentication session. The images can dynamically change each time the user attempts to log in to the device and/or web account. Accordingly, the user's image-based passcode need not be represented by a fixed sequence of images, but can be represented by different images that represent the same word for each sentence element. The dynamic changing of the images can improve the security of the systems and methods described herein, and reduce the probability of a hacker correctly deciphering the user's passcode.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer-implemented user-authentication method, comprising:
   upon receiving an authentication request for authenticating a user, selecting, by a computer server, a plurality of images from an image database for authenticating the user, wherein the image database is configured to manage images into a hierarchical structure comprising a plurality of categories, each category comprising a plurality of grammatical words, and each grammatical word associated with a set of multiple images illustrative of the same grammatical word, wherein the selecting of the plurality of images comprises:
   (i) retrieving a preselected passcode associated with the user, wherein the passcode includes a preselected sequence of grammatical words selected by the user prior to the authentication, wherein each grammatical word of the preselected sequence corresponds to a different category, and wherein the passcode has a predefined sentence structure comprising a plurality of sentence components corresponding to the different categories;
   (ii) selecting, by the computer server, a first subset of images corresponding to the preselected sequence of grammatical words, wherein each of the first subset of images is illustrative of a grammatical word in the preselected passcode and is selected at random from the set of multiple images that are illustrative of the same grammatical word from the image database, and
   (iii) selecting, by the computer server, a second subset of random images corresponding to grammatical words that are not included in the preselected sequence of grammatical words, wherein the second subset of random images are selected from the same category as the preselected sequence of grammatical words;
   providing the plurality of images as interactive media on a graphical display of a computing device associated with the user, wherein the location an image is displayed is determined at random;
   receiving input data from the computing device when the user selects a sequence of images from the plurality of images on the graphical display of the computing device in a sequential order, wherein the selected sequence of images corresponds to a sequence of grammatical words in the sequential order; and
   authenticating the user when i) the sequence of images selected by the user match the first subset of images and ii) the sequence of grammatical words in the sequential order match the preselected passcode.

2. The method of claim 1, wherein each sentence component comprises a different preselected grammatical word.

3. The method of claim 1, wherein the sequence of grammatical words is equal to the passcode when an order of the sequence of grammatical words matches the predefined sentence structure comprising the plurality of sentence components.

4. The method of claim 1, wherein the plurality of images are presented in one or more carousels on the graphical display of the computing device, and wherein the user is permitted to select one or more of the plurality of images from the one or more carousels.

5. The method of claim 4, wherein a plurality of carousels are provided, and wherein the images presented in each carousel belong to a different object class.

6. The method of claim 2, wherein the plurality of sentence components belong to two or more categories selected from the group consisting of nouns, verbs, adjectives, and object classes.

7. The method of claim 6, wherein the object classes are selected from the group consisting of geographical locations, landmarks, animals, and numbers.

8. The method of claim 6, wherein at least one image from the first subset of images and at least one image from the second subset of random images correspond to different grammatical words from a same category.

9. The method of claim 1, wherein different sets of images are presented to the user on the graphical display of the computing device during different authentication sessions.

10. The method of claim 9, wherein a first set of images is presented to the user in a first authentication session, wherein a second set of images is presented to the user in a second authentication session, wherein the first and second sets of images are different from each other, and wherein the first and second authentication sessions occur at different points in time.

11. The method of claim 9, wherein the first set of images includes a first predetermined sequence of images and the second set of images includes a second predetermined sequence of images, and wherein each of the first and second predetermined sequence of images corresponds to a sequence of grammatical words that is equal to the passcode.

12. A user-authentication system comprising:
   an image database is configured to manage images into a hierarchical structure comprising a plurality of categories, each category comprising a plurality of grammatical words, and each grammatical word associated with a set of multiple images illustrative of the same grammatical word,
   a server in communication with a computing device associated with a user and the image database, wherein the server comprises a memory for storing interactive media and a first set of software instructions, and one or more processors configured to execute the first set of software instructions to:
   upon receiving an authentication request for authenticating a user, select a plurality of images from an image database for authenticating the user, wherein the plurality of images are selected by:
   (i) retrieving a preselected passcode associated with the user, wherein the passcode includes a preselected sequence of grammatical words selected by the user prior to the authentication, wherein each grammatical word of the preselected sequence corresponds to a different category, and wherein the passcode has a predefined sentence structure comprising a plurality of sentence components corresponding to the different categories;

(ii) selecting a first subset of images corresponding to the preselected sequence of grammatical words, wherein each of the first subset of images is illustrative of a grammatical word in the preselected passcode and is selected at random from the set of multiple images that are illustrative of the same grammatical word from the image database, and (iii) selecting a second subset of random images corresponding to grammatical words that are not included in the preselected sequence of grammatical words, wherein the second subset of images are selected from the same category as the preselected sequence of grammatical words;

provide the plurality of images as the interactive media on graphical display of the computing device associated with the user, wherein the location an image is displayed is determined at random;

receive input data from the computing device when the user selects a sequence of images from the plurality of images on the graphical display of the computing device in a sequential order, wherein the selected sequence of images corresponds to a sequence of grammatical words in the sequential order; and authenticate the user when i) the sequence of images selected by the user match the first subset of images and ii) the sequence of grammatical words in the sequential order match the preselected passcode.

13. A non-transitory tangible computer readable storage medium storing instructions that, when executed by a server, causes the server to perform a computer-implemented method of authenticating a user, the method comprising:

upon receiving an authentication request for authenticating a user, selecting, by a computer server, selecting a plurality of images from an image database for authenticating the user, wherein the image database is configured to manage images into a hierarchical structure comprising a plurality of categories, each category comprising a plurality of grammatical words, and each grammatical word associated with a set of multiple images illustrative of the same grammatical word, wherein the selecting of the plurality of images comprises:

(i) retrieving a preselected passcode associated with the user, wherein the passcode includes a preselected sequence of grammatical words selected by the user prior to the authentication, wherein each grammatical word of the preselected sequence corresponds to a different category, and wherein the passcode has a predefined sentence structure comprising a plurality of sentence components corresponding to the different categories;

(ii) selecting a first subset of images corresponding to the preselected sequence of grammatical words, wherein each of the first subset of images is illustrative of a grammatical word in the preselected passcode and is selected at random from the set of multiple images that are illustrative of the same grammatical word from the image database, and (iii) selecting a second subset of random images corresponding to grammatical words that are not included in the preselected sequence of grammatical words, wherein the second subset of images are selected from the same category as the preselected sequence of grammatical words;

providing the plurality of images as interactive media on a graphical display of a computing device associated with the user, wherein the location an image is displayed is determined at random;

receiving input data from the computing device when the user selects a sequence of images from the plurality of images on the graphical display of the computing device in a sequential order, wherein the selected sequence of images corresponds to a sequence of grammatical words in the sequential order; and authenticating the user when i) the sequence of images selected by the user match the first subset of images and ii) the sequence of grammatical words in the sequential order match the preselected passcode.

14. The computer-implemented user-authentication method of claim 1, further comprising:

upon receiving a second authentication request for authenticating the user, selecting, by the computer server, a third subset of images corresponding to the preselected passcode associated with the user and a fourth subset of images corresponding to grammatical words that are not included in the preselected passcode, wherein the third subset of images are different from the first subset of images, and the fourth subset of images are different from the second subset of random images, authenticating the user when the user successfully selects the third subset of images in a sequential order match the preselected passcode.

* * * * *